Jan. 23, 1934.                W. SACKVILLE                1,944,194
                           RADIANT ENERGY DETECTOR
                             Filed Nov. 7, 1929

INVENTOR.
William Sackville
BY  W. N. Roach
           ATTORNEY.

Patented Jan. 23, 1934

1,944,194

UNITED STATES PATENT OFFICE 1,944,194

RADIANT ENERGY DETECTOR

William Sackville, Berkeley, Calif.

Application November 7, 1929. Serial No. 405,520

2 Claims. (Cl. 201—63)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a Radiant Energy Detector. Instruments for measuring radiant energy are divided into three groups.

Group I consists of non-selective radiometers such as the thermopile, which functions upon thermal conditions independently of the (frequency) wave length of stimulus.

Group II includes resistance cells such as the thalofide cell, which have the property of decreasing in electrical resistance when exposed to radiant energy of short wave lengths, the character of the phenomenon depending entirely upon the wave length of the radiant energy stimulus.

Group III includes substances called photoelectric cells which when charged to a negative potential in an evacuated chamber, lose their charge when exposed to light of short wave length.

Groups II and III which are selectively sensitive to various wave lengths will hereafter be referred to as photoelectric cells to distinguish from the thermosensitive detectors.

The invention is particularly directed to resistance photoelectric cells whose functioning is dependent on the wave length of the stimulus and it consists in providing a multiple cell, specially grouped in combinations on intersecting base lines to respectively afford by their responses lateral and vertical impressions of direction in azimuth and elevation when used in apparatus for detecting the presence and position of an invisible body.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figs. 2 and 3 are views respectively in rear and front elevation thereof;

Fig. 4 is a view in front end elevation of an alternate arrangement of the cells.

Figure 1:
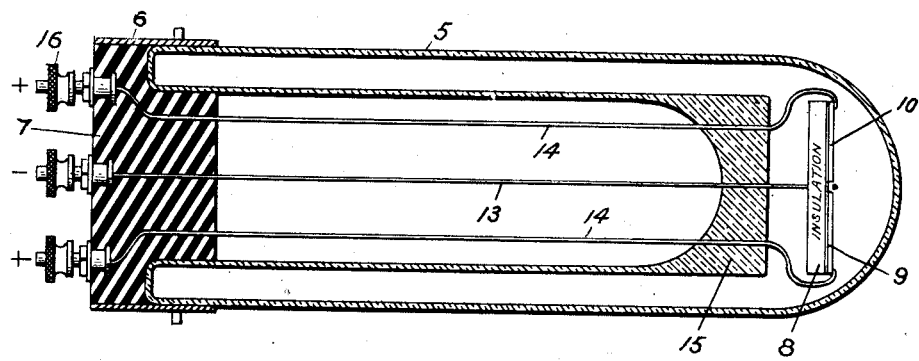
Fig. 1 is a longitudinal sectional view of a multicell tube constructed in accordance with the invention.
Figure 1:
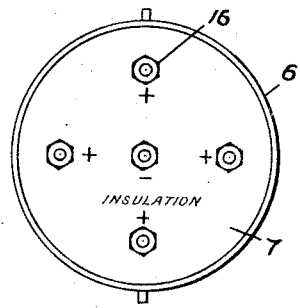
Figure 1:
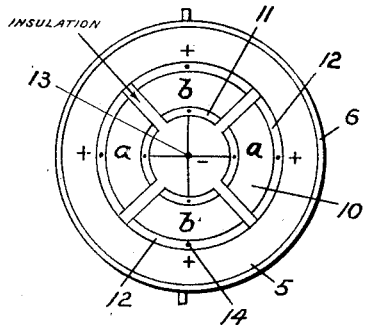
Figure 1:
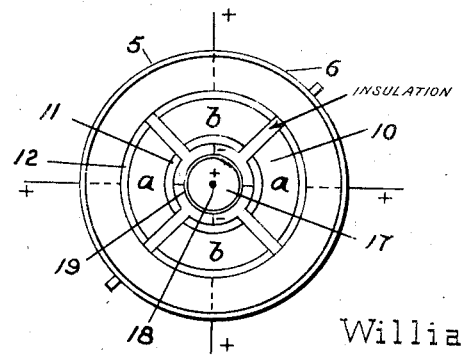

Referring to the drawing by characters of reference:

There is shown an evacuated container 5 which is of the conventional tube type having a standard socket 6 containing insulating material 7.

In the forward part of the tube there is a disk 8 of insulation which carries on its exposed face the photosensitive material 9, such as thalofide or caesium, of a plurality of cells. The material 9 is in annular form and is divided into a number of spaced equal segments 10, four of such segments being shown to provide combinations on intersecting base lines. Electrodes 11 and 12 are respectively provided on the inner and outer marginal portions of each of the segments 10, the inner electrodes being connected to a single lead wire 13 and the outer electrodes having individual lead wires 14. The lead wires are sealed in the base 15 of the container and pass through the insulation 7 to the binding posts 16.

Referring to an alternate arrangement shown in Fig. 4, a body of photosensitive material 17, preferably circular, is placed on the disk 8 within the segments 10 and provided with a central electrode 18 and a marginal electrode 19. In this arrangement the intermediately positioned marginal electrodes 11 and 19 are of the same sign.

The response of the cells to radiant energy may be indicated by any well-known device for indicating the flow of electric current.

In employing a multiple cell tube to detect the presence and position of an invisible object, the plus terminals joined to the segments "b—b" are connected to a suitable source of current supply and an indicating device, for instance a galvanometer, is included in this branch of the circuit. In like manner the plus terminals joined to the segments "a—a" are connected to the source of electrical supply and an indicating device provided in this branch of the circuit. The minus terminal is connected to the minus pole of the source of electrical supply. When the tube is employed, if the radiations are concentrated or focused by the use of a mirror as shown in Patent No. 1,343,393 of June 15, 1920 on one of the segments its electrical resistance will be reduced thereby unbalancing the circuit and causing a flow of current to afford an indication of the direction in which the tube must be moved in order to receive the radiations on the longitudinal axis of the tube. In this way the paired cells $a—a$ and $b—b$ produce a manifestation of directional effects in azimuth and elevation and afford a means for balancing the response of the cells, with or without the aid of the central cell 17, to maintain the tube centered on the source of radiant energy.

When using the modified tube illustrated in Fig. 4, the connections are the same as heretofore specified for the preferred form and in addition thereto the electrode 18 is connected to the plus terminal of the source of electrical supply and an indicator included in that branch of the circuit. By this arrangement a more positive indication is afforded of the centering of the tube on the object.

I claim:

1. In a radiant energy detector, a container, an insulated support in the container, a plurality of oppositely paired spaced segments of photosensitive material annularly arranged on the support, electrodes on the inner and outer marginal portions of the segments, a body of photosensitive material carried by the support within the segments, a central and a marginal electrode on said body, the intermediately positioned marginal electrodes being of the same sign, and lead wires for the electrodes.

2. In a radiant energy detector, a container, an insulated support in the container, a plurality of spaced segments of photosensitive material annularly arranged on the support, electrodes on the inner and outer marginal portions of the segments, a body of photosensitive material carried by the support within the segments, a central and a marginal electrode on said body, and lead wires for the electrodes.

WILLIAM SACKVILLE.